Dec. 8, 1970  J. E. SARGEANT ET AL  3,545,027
WINDOW CLEANING SYSTEM FOR THE TAILGATE WINDOW OF A VEHICLE
Filed Jan. 3, 1969  2 Sheets-Sheet 1
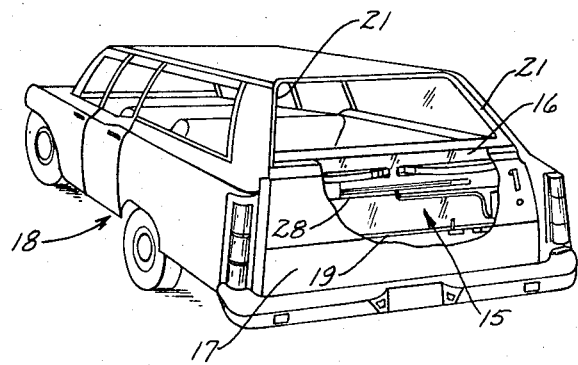
Fig. 1
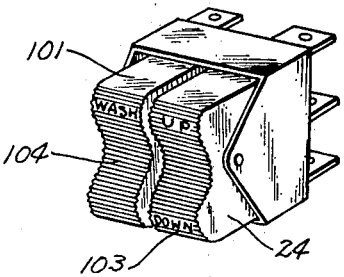
Fig. 10
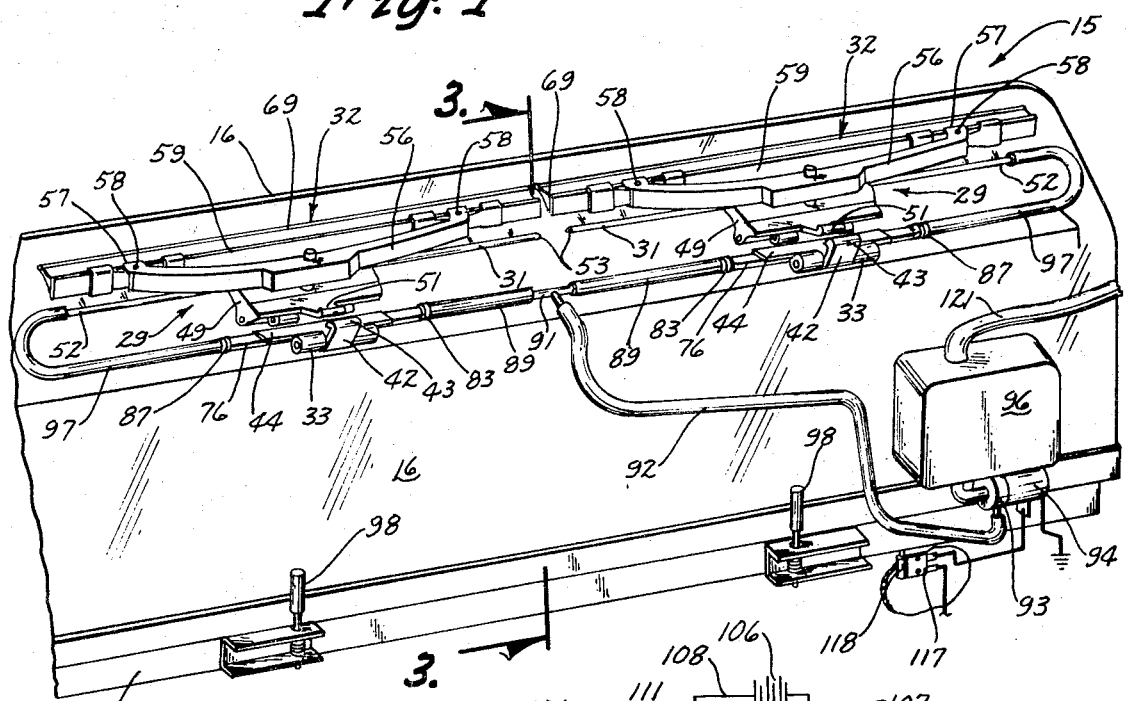
Fig. 2
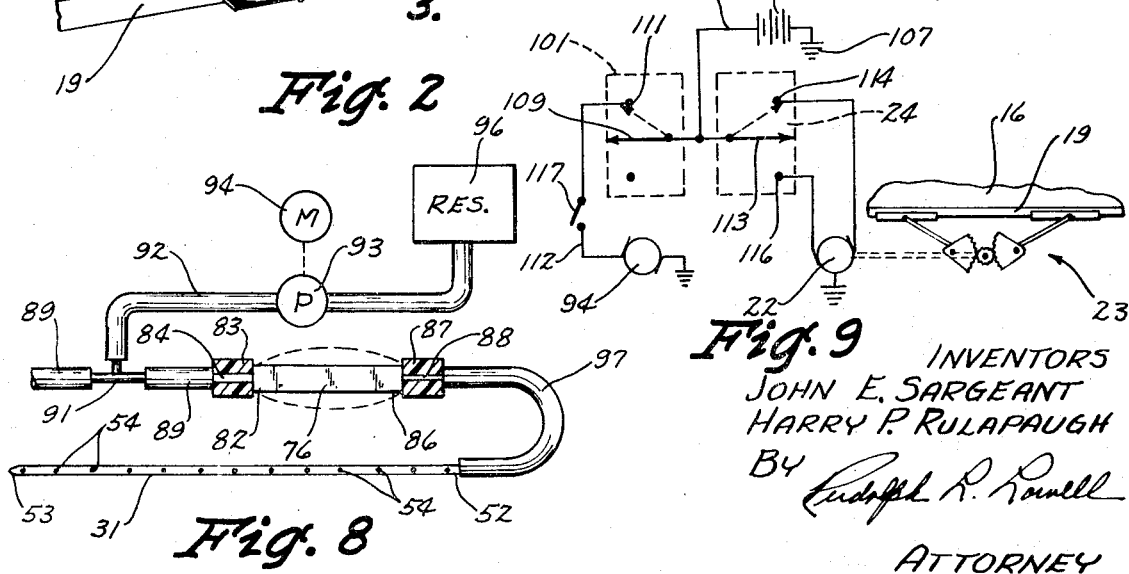
Fig. 8
Fig. 9
INVENTORS
JOHN E. SARGEANT
HARRY P. RULAPAUGH
BY
Rudolph L. Lowell
ATTORNEY

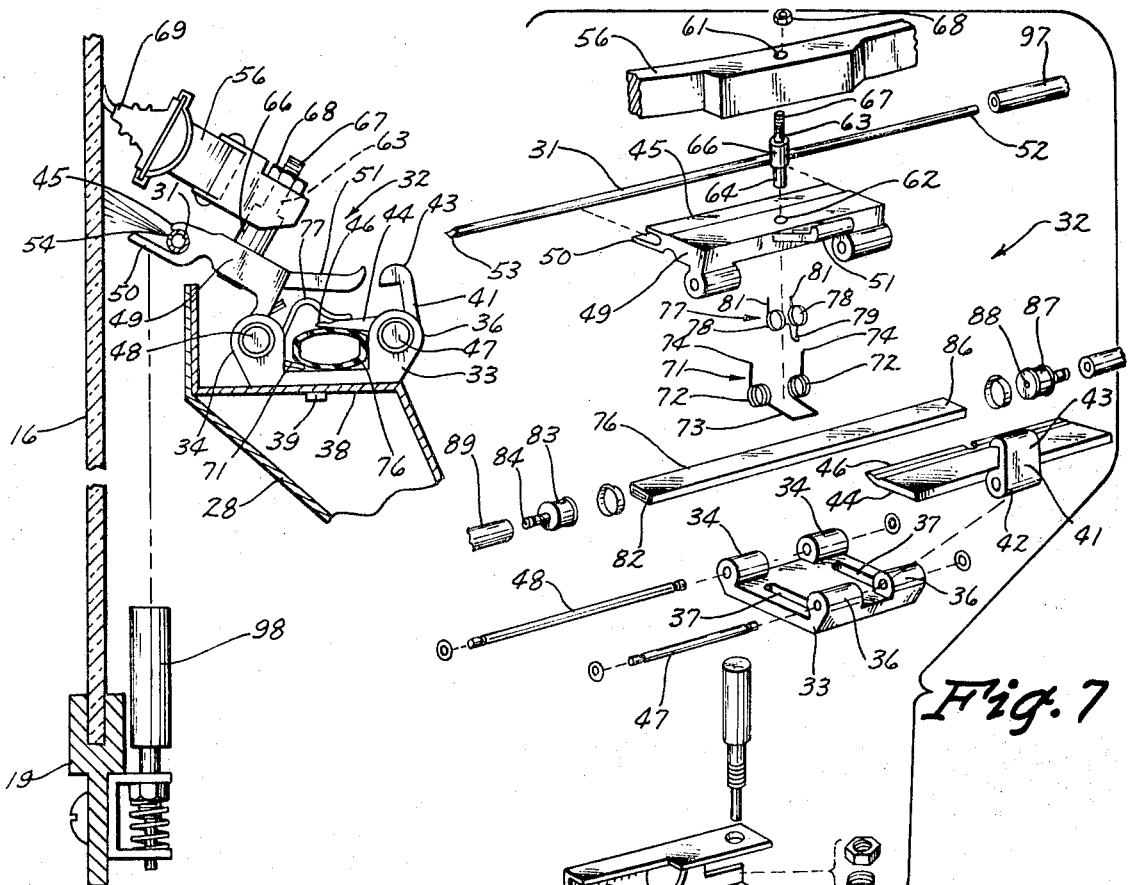
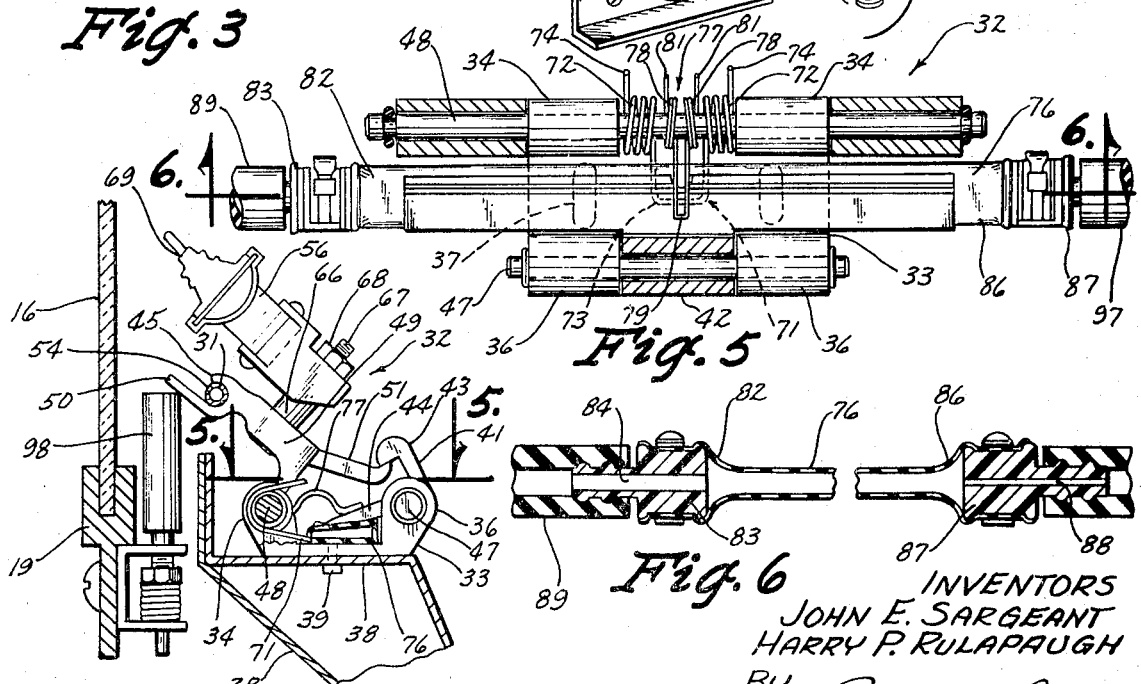

United States Patent Office 3,545,027
Patented Dec. 8, 1970

3,545,027
WINDOW CLEANING SYSTEM FOR THE TAILGATE WINDOW OF A VEHICLE
John E. Sargeant and Harry P. Rulapaugh, both of 7055 Fenkell Ave., Detroit, Mich. 48238
Filed Jan. 3, 1969, Ser. No. 788,740
Int. Cl. B60s 1/48
U.S. Cl. 15—250.04                       6 Claims

ABSTRACT OF THE DISCLOSURE

A system for cleaning the tailgate window of a station wagon wherein a wiper blade and fluid discharge unit extended transversely in a parallel relation along the outer surface of the window or supported within the tailgate for pivotal movement together toward and away from the window at a position opposite the upper portion of the window when the window is in a down position. On an upward movement of the window fluid is supplied to the discharge unit concurrently with the pivotal movement of the wiper blade into wiping engagement with the window outer surface. When the window reaches the up position therefor the wiper blade is moved out of window wiping engagement concurrently with the shutting off of the fluid supply to the discharge unit.

SUMMARY OF THE INVENTION

The tailgate window cleaning system of this invention is of a compact construction for ready installation within the confines of the tailgate of a vehicle so as not to detract from the vehicle appearance or to offer any obstruction to a normal use of the tailgate. During a cleaning operation the window is moved relative to the wiper blade. The mounting of the wiper unit and fluid discharge unit for pivotal movement together relative to the window maintains the fluid discharge against the window ahead of the blade wiping action. The movement of the window to its up position acts to automatically move the wiper blade out of wiping engagement with the window to a releasably locked park position that is maintained for so long as the window is in the up position. The discharge of fluid takes place only when the window is out of an up position at which time the pressure of the fluid supply to the discharge unit is capable of releasing the wiper blade from its park position. Engagement of the wiper blade with the window and the discharge fluid onto the window thus occurs only when the window is out of the up position. The movement of the window and the supply of fluid to the discharge unit are relatively controlled by control switches that are arranged on the vehicle instrument panel for concurrent operation by one hand. The window is thus capable of a normal use independently of the cleaner system and for conjoint use with the cleaner system during a window cleaning operation.

DETAILED DESCRIPTION OF THE INVENTION

Referring to the drawings,

FIG. 1 is a rear perspective view of a station wagon with portions of the tailgate removed to show the assembly therewith of the tailgate window cleaning system of this invention;

FIG. 2 is an enlarged perspective view of the window cleaning system;

FIG. 3 is an enlarged sectional view taken along the line 3—3 showing the positions of the wiper blade and the fluid discharge unit relative to the tailgate window at the commencement of a window cleaning operation;

FIG. 4 is illustrated similarly to FIG. 3 and shows the wiper unit and fluid discharge unit in their park positions on termination of a window cleaning operation;

FIG. 5 is a sectional view as seen along the line 5—5 in FIG. 4 of the pivotal mounting means for the wiper unit and fluid discharge unit;

FIG. 6 is a detail sectional view as viewed on line 6—6 in FIG. 5 showing the actuating means for releasing the wiper unit from a park position therefor;

FIG. 7 is an exploded perspective view of the wiper unit and fluid discharge unit assembly;

FIG. 8 is a schematic showing of the fluid supply system;

FIG. 9 is a diagrammatic showing of the electrical system; and

FIG. 10 is a perspective view of the control switches for controlling the operation of the window and fluid supply system.

Referring to FIG. 1 of the drawings, the window cleaning system of this invention, designated generally as 15, is illustrated in assembly relation with a window 16 provided in the tailgate 17 of a vehicle 18 of station wagon type. The window 16 includes a usual bottom mounting sill 19 and is supported in a well known manner within the tailgate 17 for up and down movement so as to constitute a rear window for the vehicle when the tailgate is closed. With the tailgate closed the window is movable up and down within side window channels 21 provided in the vehicle body.

As illustrated in FIG. 9, the window 16 is electrically operated by a reversible electric motor 22 that is connected with the window lower sill 19 through a transmission lever mechanism 23 that operates to lower and raise the window 16 in response to the actuation of a control switch 24 that is carried on the instrument panel (not shown) of the vehicle 18.

The tailgate 17 (FIG. 1) is of a usual hollow construction having spaced front and rear walls and a top opening through which the window 16 is movable. A reinforcing panel or brace 28 extended longitudinally of the tailgate 17 between the front and rear walls is connected to the tailgate end walls, all in well known manner.

The cleaning system 15 (FIG. 2) is located within the tailgate, which constitutes a housing therefor, and includes a pair of wiper units 29 and corresponding pairs of fluid discharge or nozzle units 31. The wiper unit and nozzle unit assemblies 32 are arranged in an end to end relation extended longitudinally of the tailgate 17 so as to be disposed transversely of the window 16 over substantially the full width thereof. Since the assemblies 32 of a wiper unit 29 and nozzle unit 31 are identical in construction and operation only one of such assemblies 32 will be described in detail with like numbers being applied to like parts.

An assembly 32 (FIGS. 5 and 7) includes a base plate 33 of a generally rectangular shape that is formed at a pair of opposite ends thereof with upstanding spaced pairs of front and rear bearing members 34 and 36, respectively. Extended between each pair of opposite bearings 34 and 36 is an elongated slot 37. The base plate 33 (FIG. 3) is supported on a horizontal portion 38 of the reinforcing panel 28 with the bearings 34 and 36 extended longitudinally of the tailgate. Bolts 39 inserted through the slots 37 and openings (not shown) in the panel portion 38 provide for a fore and aft adjustment of the base plate 33 for a purpose to appear later.

Hingedly connected with the base plate 33 at the rear bearings 36 (FIGS. 3 and 7) is a bell crank member 41 integrally formed with a tubular bearing 42 that has an upwardly projected forward facing hook member 43 and a forwardly extended plate member 44 having an upwardly turned front side 46. The plate member 44 is of an elongated rectangllar shape and extends in opposite directions from the bearing member. The bearing 42 is received between the base plate rear bearings 36 for hinged connection to the base plate 33 by a hinge pin 47 inserted through the bearings 36 and 42 to provide for an up and down pivotal movement of the plate member 44 concurrently with a fore and aft pivotal movement of the hook member 43.

Pivotally connected by a hinge pin 48 to the base member 33 at the front bearing members 34 and forwardly extended therefrom for pivotal up and down movement is a mounting bracket 49. Projected rearwardly from the mounting bracket 49 is a latch member 51 which is movable into locking engagement with the hook member 43 for a purpose to appear later. The front end of the bracket or mounting member 49 is of a bifurcated construction to frictionally receive between the bifurcations 45 and 50 thereof the central portion of the elongated nozzle unit 31 which is illustrated as a pipe member having an open inlet and 52 and a closed end 53. A series of fluid discharge openings 54 are spaced longitudinally in the front side of the pipe member 31 for the discharge of fluid against the rear surface of the tailgate window 16.

The mounting member 49 (FIG. 2) also carries the wiper unit 29 which includes a horizontally extended wiper arm 56 of a channel shape in transverse cross section. The wiper arm is curved longitudinally thereof with its open concave side faced forwardly. Connecting portions 57 at opposite ends of the wiper arm 56 are pivotally connected at 58 to longitudinally spaced portions of a wiper blade assembly 59.

The central portion of the wiper arm 56 (FIG. 7) has a vertically extended opening 61 that is aligned with an opening 62 in the mounting member 49. A spacer shaft 63 has a reduced section 64 within the opening 62, a bearing portion 66 within the opening 61 and a reduced threaded section 67 projected upwardly from the wiper arm 56. By forming a rivet head on the reduced section 64 and applying a holding nut 68 on the threaded section 67 the wiper arm 56 is pivotally movable on the bearing section 66 to provide for a limited longitudinal tilting movement of the wiper blade 69 of the blade assembly 59 relative to the rear or outer surface of the window 16.

As best appears in FIGS. 3 and 4 the wiper blade 69 and the pipe member or nozzle unit 31 are arranged in a parallel spaced relation transversely of the window and inclined upwardly and forwardly with the pipe member 31 located below the wiper blade 69. On a downward pivotal movement of the mounting member 49 the wiper blade 69 is brought into wiping engagement with the rear surface of the window 16 (FIG. 3). When the mounting member is pivotally moved upwardly the wiper blade 69 is moved out of wiping engagement as shown in FIG. 4. The location of the wiper blade relative to the window 16 to provide for its movement into and out of wiping engagement with the window 16 in response to a reversed pivotal movement of the mounting member 49 is accomplished by the adjustment of the base plate 33 transversely of the reinforcing panel 28 through the bolt and slot connection 37, 39.

To yieldably maintain the wiper blade 69 in wiping engagement with the window 16 there is provided a torsion spring 71 (FIGS. 3 and 5) having a pair of coil sections 72 spaced longitudinally of and mounted about the hinge pin 48 between the front bearings 34 so that each coil section 72 is adjacent a bearing 34. The inner ends of the coil section 72 are interconnected by a U-shape connecting section 73 that is positioned against the base plate 33 with the outer ends 74 of the coil sections 72 arranged in bearing engagement against the rear end of the mounting bracket 49. The torsion spring 71 thus acts to continuously and yieldably pivot the mounting bracket 49 in a downward and forward direction about the hinge pin 48.

Extended longitudinally of the tailgate 17 and across the top surface of the base plate 33 (FIGS. 4 and 5) between the bearings 34 and 36 is a normally flat conduit or hose section 76 that forms part of the fluid supply system to a nozzle unit 31. The plate member 44 is located above the hose section 76 for pressing engagement with the top side thereof to maintain the flat condition of the hose section when the wiper blade 69 is in its park position out of engagement with the window 16 (FIG. 4).

The plate member 44 is yieldably urged downwardly against the hose section 76 by a torsion spring 77 (FIGS. 4 and 5) that has a pair of coil sections 78 mounted about the hinge pin 48 between the coil sections 72 of the wiper blade torsion spring 71. The inner ends of the coil sections 78 of the plate spring 77 are interconnected by a curved U-shape section 79 that overlies the plate member 44. The outer ends 81 of the coil sections 78 are in bearing engagement with the rear end of the mounting bracket 49. On a rearward pivotal movement of the mounting member 49 to park the wiper blade 69 the pressure of the spring 77 is increased so as to urge the plate member 44 downwardly to depress and hold the hose section 76 in its normally flat condition.

As shown in FIG. 6 the hose section 76 has a fluid inlet end 82 clamped about an enlarged section of a connector member 83 that has a reduced hose connection projected outwardly from one end. A bore 84 is extended axially of the connector m member 83. The outlet end 86 of the hose section 76 is provided with a similar connector member 87 that has an axial bore 88 of a reduced diameter relative to the bore 84 in the inlet connector member 83. The inlet connector member 83 (FIGS. 2 and 8) is connected by a line 89 to one side of a T-connection 91, the stem of which is connected by a fluid line 92 to the outlet of a gear pump 93 that is operated by an electric motor 94. The inlet of the pump 93 is connected to a fluid reservoir 96. The outlet connector 87 is connected by a fluid line 97 to the inlet end 52 of the nozzle unit 31.

A wiper blade 69 as shown in FIG. 4, is releasably locked in a park position by the engagement of the latch member 51 on the mounting bracket 49 with the hook member 43 of the bell crank 41. In this park position the torsion spring 71 tends to move the latch and hook out of their engaged positions while the torsion spring 77 acts against the plate member 44 to hold the hose section 76 in its normally flat condition.

On operation of the pump motor 94 to supply fluid to a nozzle unit 31 the difference in the diameter of the axial bores 84 and in the connector members 83 and 87, respectively, provides for a fluid pressure build-up in the hose section 76 that acts to expand or blow up the hose section from its normally flat condition. The expansion of the hose section 76 overcomes the holding action of the torsion spring 77 on the pressure plate 44 and provides for an upward and rearward pivotal movement of the plate 44 about the hinge pin 47. Since the plate member 44 and the hook member 43 constitute the arms of the bell crank 41 and are pivotally movable together as a unit the hook member is pivoted rearwardly out of engagement with the latch member 51. The mounting bracket 49 is thus released and the wiper blade 69 is moved into engagement with the rear surface of the window 16 by the torsion spring 71. Fluid is thus discharged onto the window concurrently with or prior to the wiping engagement of a wiper blade 69 with the window 16.

In the use of the cleaning system of this invention it is contemplated that the window cleaning operation be initiated when the window 16 is in its down position shown in FIG. 3. With the wiper blade 69 in wiping engagement with the window and with the fluid discharged thereon at a position below the blade the window is operated to its upper position. During this upward movement of the window 16 fluid is discharged against the window rear surface across the full width thereof by the conjoint action of the nozzle units 31 to loosen foreign material thereon, after which the window is cleared by the upward movement thereof relative to the wiper blades 69.

As the window is moved into its up position, each wiper blade 69 is automatically moved to its park position concurrently with a cut down in the supply of fluid to the nozzle units 31, by a pair of reset pins 98 corresponding to the pair of assemblies 32 (FIG. 2). The reset pins 98 are carried adjacent opposite ends of the window bottom sill 19 at positions vertically below the front ends of corresponding mounting brackets 49. The lower bifurcation 50 (FIG. 4) at the front end of a mounting bracket 49 projects forwardly and upwardly so that its lower side forms an inclined cam surface that is engageable with the reset pin 98 which is spring pressed in an upward direction.

As the window 16 approaches its up position a reset pin 98 yieldably engages a bifurcation 50 to pivot a corresponding mounting bracket 49 upwardly and rearwardly from its position in FIG. 3 to its position shown in FIG. 4. During this pivotal movement of the mounting bracket 49 the plate torsion spring 77 is actuated to move the pressure plate 44 downwardly against the hose section 76 whereby the latch member 51 and hook member 43 are relatively moved into locking engagement. So long as the window 16 is in its up position therefor the reset pins 98 hold the latch member 51 and hook member 43 against disengagement whereby the wiper blades 69 are positively held in their park positions against release to wiping positions in response to a fluid pressure build-up in the hose sections 76. Stated otherwise the blades 69 are movable into wiping engagement with the window only when the window is out of its up position.

To facilitate a conjoint action of the window motor 22 and pump motor 94, their respective control switches 24 and 101 may be assembled together into a single switch unit as shown in FIG. 10. The window 16 is operated up or down by merely pushing down on one or the other of the ends of a tilt knob 103, the "up" end of which is located adjacent the "wash" end of an adjacent like tilt knob 104 for the pump motor 94. A sole manipulation of the tilt knob 103 provides for a normal operation of the window 16.

For a cleaning operation the window 16 is initially moved to its lowered position after which the knobs 103 and 104 are tilted together to their respective "up" and "wash" positions. The knobs 103 and 104 are manually held in such positions until the window 16 has been moved to its up position.

As shown in FIG. 9 the circuit for the motors 22 and 94 includes a usual vehicle battery 106 having a ground 107 and a common lead line 108 to the control switches 24 and 101. The switch 101 has a movable contact 109 connected to the lead line 108 and movable from a neutral position, shown in full lines, into and out of engagement with a "wash" terminal 111 that is connected to the motor 94 through line 112.

The switch 24 includes a movable contact 113 connected to the lead line 108 and selectively movable from its neutral position, shown in full lines, into engagement with "up" and "down" terminals 114 and 116, respectively, for closing the circuit to the reversible motor 22.

In a cleaning operation of the window 16 the fluid pump 94 is operated whenever the tilt knob 103 is tilted to a "wash" position. The pump 93, therefore, may be continuously operated to discharge fluid from the nozzle units 31 during the full movement of the window from a lowered to a raised position therefor, or intermittently during such window movement.

Since the window is flooded across the top portion thereof on an initial operation of the fluid pump 93, the cleaning fluid may be conserved by limiting the pump action to a single initial fluid discharge. Thus, as shown in FIG. 2, a normally open limit switch 117 connected in series with the pump motor 94, is carried in the tailgate 17. When the window 16 reaches its down position the switch actuator 118 is depressed by the window sill 19 so as to close the limit switch 117. On actuation of the washer control switch 101 the pump motor 94 is energized to provide for an inflation of the hose sections 76 and fluid discharge onto the window 16. The pump 93 remains in operation until the window sill 19 is raised out of engagement with the limit switch 117. At such time the supply of fluid to the nozzle units 31 is discontinued and the initial fluid discharge is cleared over the full height of the window as the window is moved to its up position.

The limit switch 117, pump 93, motor 94, motor 22 and fluid reservoir 96 may be suitably mounted from either the reinforcing panel 28 or the tailgate rear wall. An inlet pipe 121 to the reservoir 96 may have its filler end open to either the tailgate rear wall or, as illustrated in FIG. 2, to an end wall of the tail gate.

We claim:
1. A cleaning system for a vehicle window movably supported for up and down movement in the vehicle body, comprising:
   (a) a wiper unit and nozzle unit assembly, said wiper unit including a wiper blade extended transversely of the window adjacent the outer side thereof, and said nozzle unit including an elongated fluid discharge member extended in a parallel relation with and below said wiper blade having a series of longitudinally spaced orifices facing said window outer side,
   (b) means on said vehicle body pivotally supporting said assembly for pivotal movement to two positions about an axis extended transversely of the window at a location opposite the upper portion of the window when the window is in the down position therefor, said wiper blade on pivotal movement of the assembly to a first one of said positions being engageable with said outer surface, and on pivotal movement of the assembly to the second one of said positions being out of engagement with said outer surface,
   (c) means for yieldably biasing the assembly to said first position,
   (d) means for releasably locking the assembly in said second position,
   (e) means on said window for engaging and moving said assembly to and holding the assembly in the second position therefor when the window is moved into the up position therefor,
   (f) means for supplying fluid under pressure to said fluid discharge member, and
   (g) means, when the window is moved from the up position therefor, for releasing said locking means in response to the pressure of the fluid supplied to said fluid discharge member.

2. The cleaning system for a vehicle window according to claim 1 wherein:
   (a) said fluid supply means includes a pump and an electric drive motor therefor,
   (b) a fluid line including a flexible portion for connecting the outlet of said pump with the fluid discharge member, and
   (c) means interconnected with said locking means for depressing said portion of the fluid line to a flat condition to stop the flow of fluid to said discharge member when said assembly is in the second position therefor,
   (d) said fluid line portion being released by said depressing means concurrently with movement of the assembly from the second position to the first position therefor.

3. A cleaning system for a vehicle window movably supported on the vehicle body for up and down movement comprising:
   (a) a wiper unit and fluid discharge unit,
   (b) a common mounting means for said two units,
   (c) said wiper unit including a wiper blade extended transversely of said window adjacent the outer surface thereof, and said fluid discharge unit including a pipe member arranged parallel to and below said wiper blade, (d) means pivotally supporting said mounting means for pivotal movement on said vehicle body at a location opposite the upper portion of the window when the window is in the down position therefor, (e) said wiper blade in a first pivotally moved position of said mounting means being moved into wiping engagement with said outer surface, and in a second pivotally moved position of said mounting means being moved out of said wiping engagement, (f) coacting means on said mounting means and vehicle body for releasably locking said mounting means in the second moved position therefor, (g) means for biasing said mounting means to the first position therefor, (h) means on said window for moving said locking means to the locked position therefor when the window is moved to the up position therefor, (i) means responsive to the pressure of the fluid in said fluid line for releasing said locking means to provide for the pivotal movement of said mounting means by said biasing means to the first moved position therefor, when the window is out of the up position.

4. The cleaning system according to claim 3 wherein:

(a) said releasable locking means includes a latch member on said mounting means and a pivoted hook member pivotally supported on the vehicle body for engagement with the latch member when the mounting means is in the second position therefor, (b) said fluid pressure responsive means including a clamping unit having a stationary clamp member secured to said vehicle body and coacting pivoted clamp member interconnected with said hook member for pivotal movement therewith, and (c) a flexible line portion in said fluid line disposed between said two clamp members, (d) said flexible line portion, when the mounting means is in the second position therefor, being flattened between said two clamp members and, when the window is out of the up position, being expandible against the movable clamp member by the fluid pressure in said fluid line to pivotally move said hook member out of engagement with the latch member to release said locking means.

5. The cleaning system according to claim 4, wherein:

(a) said flexible line portion has a fluid inlet end and a fluid outlet end, (b) said inlet end having a cross sectional area greater than the cross sectional area of said outlet end.

6. A cleaning system for a vehicle window movably supported for up and down movement on the vehicle body comprising:

(a) a wiper blade and an elongated fluid discharge member extended in a parallel relation transversely of the window adjacent the outer surface thereof with the fluid discharge member below the wiper blade, (b) means supporting the wiper blade and discharge member on the vehicle body for pivotal movement as a unit to a first position wherein the wiper blade is in wiping engagement with said outer surface and to a second position wherein the wiper blade is out of said wiping engagement, (c) means for releasably locking said supporting means in the second position therefor, (d) means for biasing the supporting means to said first position therefor, (e) means responsive to the supply of fluid to said discharge member for releasing said locking means to provide for the movement of the supporting means by said biasing means from the second position therefor, (f) coacting means on the window and on said supporting means for moving the supporting means from the first position to the second position therefor in response to movement of the window to the up position therefor, and (g) means for relatively controlling the supply of fluid to the discharge member and the movement of said window to provide for a cleaning of the window during upward movement thereof.

References Cited

UNITED STATES PATENTS 2,666,941  1/1954  Oishei _____ 15—250.1
3,452,384  7/1969  Scinta _____ 15—250.1

ROBERT W. MICHELL, Primary Examiner

U.S. Cl. X.R.

15—250.1